Nov. 10, 1970 T. R. PRYOR 3,539,262
OPTICAL INTERFEROMETER FOR HIGH SPEED PLASMA DIAGNOSTICS
Filed June 11, 1968
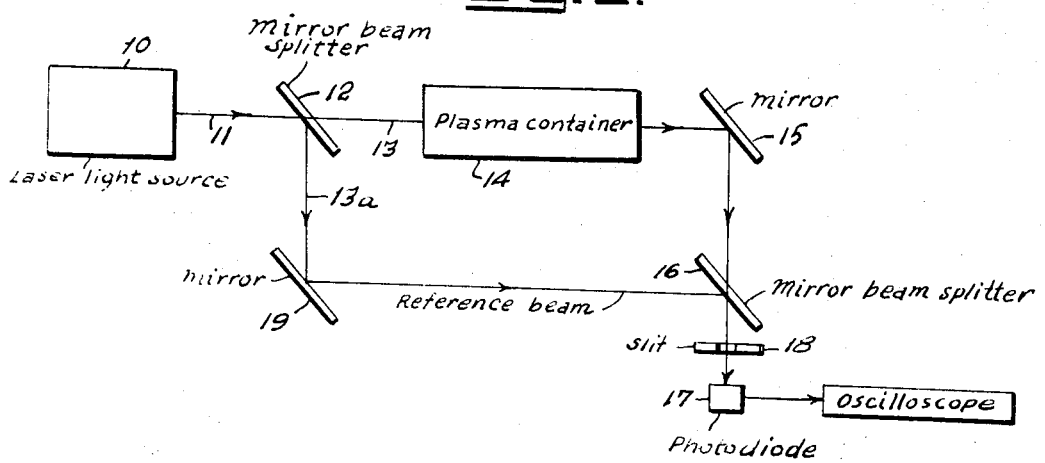
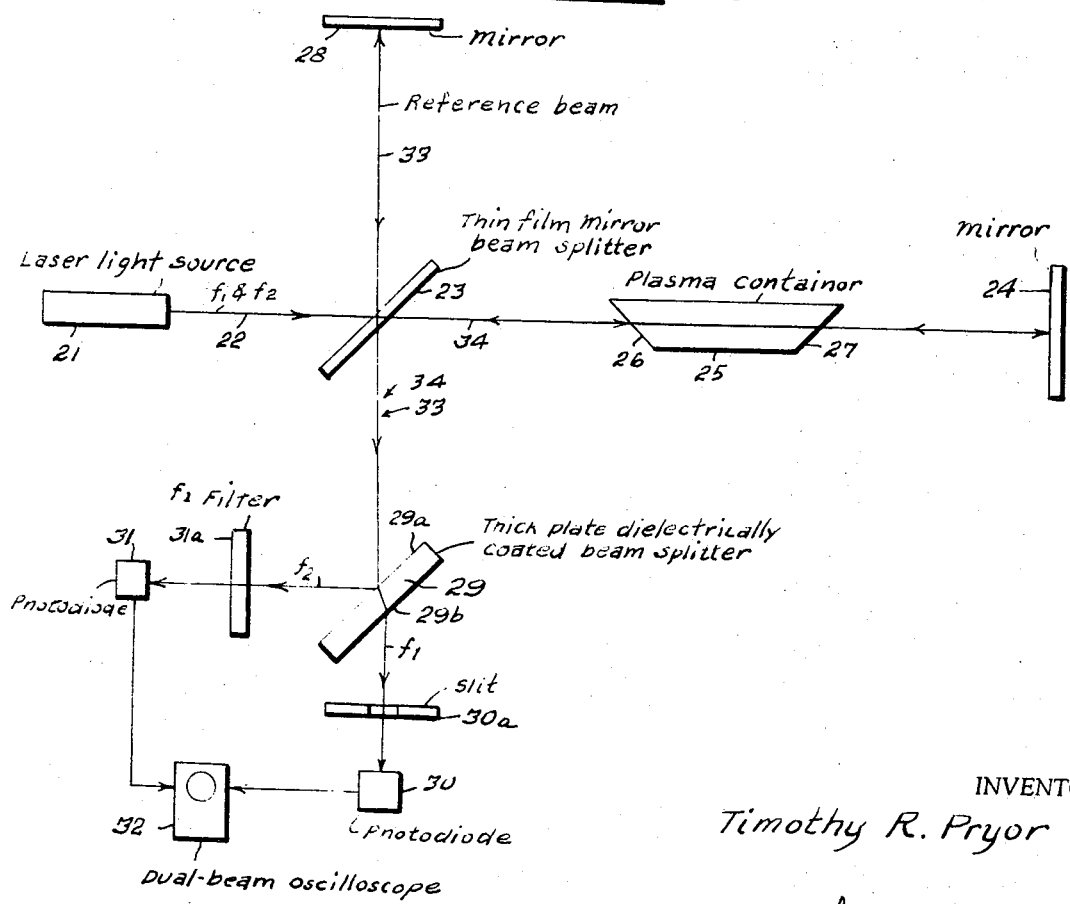
INVENTOR,
Timothy R. Pryor
BY: Harry M. Saragovitz,
Edward J. Kelly &
R. P. Gibson                ATTORNEYS United States Patent Office 3,539,262
Patented Nov. 10, 1970

3,539,262
OPTICAL INTERFEROMETER FOR HIGH SPEED PLASMA DIAGNOSTICS
Timothy R. Pryor, Bethesda, Md., assignor to the United States of America as represented by the Secretary of the Army
Filed June 11, 1968, Ser. No. 736,130
Int. Cl. G01b 9/02
U.S. Cl. 356—107                                3 Claims

ABSTRACT OF THE DISCLOSURE

An optical interferometer for high speed plasma diagnostics wherein a laser beam is divided into two beams, one which passes through the plasma and the other which acts as a reference, and which are subsequently superimposed and impinged on a photodiode which sums the electric fields thereof, resulting in the modulation of the output current of the photodiode at the difference frequency which is displayed on an oscilloscope coupled to the output of the photodiode.

---

The invention described herein may be manufactured, used and licensed by or for the Government for governmental purposes without the payment to me of any royalty thereon.

The use of laser interferometers for high intensity plasma experiments is well known. However, such current devices produce fringes which move as the plasma index of refraction changes. Reading rapid movements of such fringes requires high speed photography or a photo detector to count the fringes moved through. The laser interferometer utilizing high speed photography is complex, troublesome in adjustment and limited in speed. The laser interferometer employing the photo detector is limited in its ability to accurately count fractional fringe movements. In addition, both embodiments present great difficulties in two-wavelength operation.

The optical interferometer for high speed plasma diagnostics of the instant invention overcomes the above mentioned limitations and permits index of refraction changes so rapid that oscilloscope response becomes the only limitation.

Accordingly an object of the invention is an optical interferometer for rapid measurement of phase changes due to electron density variations in the plasma.

Another object of the invention is an optical interferometer for high speed plasma diagnostics operating at two-wavelengths for determining the relative electron and ion contributions to phase changes.

The invention will be more fully understood and its objects and advantages further appreciated by referring now to the detailed description taken in conjunction with the accompanying drawings in which:

FIG. 1 is a schematic representation of the optical interferometer for high speed plasma diagnostics constructed in accordance with the concepts of one embodiment of the invention; and FIG. 2 is a schematic representation of the optical interferometer for high speed plasma diagnostics constructed in accordance with the concepts of another embodiment of the invention.

The optical interferometer for high speed plasma diagnostics schematically shown in FIG. 1 includes a laser light source 10 which produces a coherent high intensity light beam, indicated by reference numeral 11, along a particular path. A mirror beam splitter 12 angularly disposed in the path of beam 11 divides beam 11 into two beams 13 and 13a. Beam 13 thereof passes through the plasma in plasma container 14 to a mirror 15, angularly disposed as mirror 12, which reflects beam 13 at right angles to the direction of beam 11 onto a mirror beam splitter 16, spaced from and in alignment with mirror 15, which passes it therethrough onto photodiode 17 through slot 18. Beam 13a is the reference beam directed by mirror beam splitter 12 to mirror 19 which is spaced from and in angular alignment with mirror beam splitter 12 and mirror beam splitter 16. Mirror 19 reflects reference beam 13a onto mirror beam splitter 16 where it is superimposed on reflected beam 13. These superimposed beams are then passed through slot 18 to impinge on photodiode 17 which sums the electric fields of these beams, resulting in modulation of the current output of photodiode 17 at the difference frequency which is read directly on the face of the cathode ray tube of oscilloscope 20 coupled to the output of photodiode 17 whereon each minima corresponds to a $\lambda/2$ phase difference between the two beams 13 and 13a. This type of heterodyne or coherent detection effectively discriminates between plasma light, noise, and the phase shifted laser light passing through the plasma.

In some instances, a laser source operating at two wavelengths is essential for determining the relative electron and ion contributions to phase changes. Accordingly in FIG. 2 there is schematically illustrated another embodiment of the invention wherein the optical interferometer for high speed plasma diagnostics operates in the two-wavelength mode and provides two passes through the plasma resulting in twice the sensitivity.

In FIG. 2, reference numeral 21 indicates a laser source which may consist of two single mode lasers each operating on a different frequency, identified in the schematic by reference characters $f_1$ and $f_2$, and arranged so that the beams thereof are superimposed on one another to produce the laser beam 22. If desired, for example, a single laser such as an ionized argon gas device could be used instead of the aforementioned separate lasers. The ionized argon gas device produces two principal wavelengths in the blue and yellow (as well as eight others which may be eliminated) and has the capability of providing outputs in excess of 10 watts per wavelength for a few second bursts. A thin film mirror beam splitter 23, spaced from laser source 21, is disposed in the path of superimposed laser beams 22 at 45° thereto. A reflecting mirror 24 also disposed in the path of the superimposed laser beams 22 is spaced from the thin film mirror bear splitter 23. Interposed between beam splitter 23 and mirror 24 in the path of the superimposed laser beams 22 is plasma container 25 which is provided with Brewster angles 26 and 27 to eliminate reflections for light polarized in the plane of the windows. A second mirror 28 is positioned along a path at right angles to the path of superimposed laser beams 22 in alignment with and opposite to one surface of thin mirror beam splitter 23, and a thick plate dielectrically coated beam splitter 29 is also positioned along the path at right angles to the path of superimposed laser beams 22 in the same angular position as thin beam splitter 23, but in opposition to mirror 28. A photodiode 30 is spaced from the back surface 29a of thick plate beam splitter 29 substantially along the last mentioned path. A slot member 30a is interposed between surface 29a and photodiode 30. At right angles to the last mentioned path and spaced from the front surface 29b of thick plate beam splitter 29 along a line intersecting the center of front surface 29b is a photodiode 31. Intermediate surface 29a and photodiode 31 is positioned filter 31a. The outputs of photodiodes 30 and 31 are coupled to the inputs of an oscilloscope 32.

In practicing the invention, the two superimposed laser beams generated by laser source 21, each of a different frequency—namely $f_1$ and $f_2$, forming beam 22 strike thin film mirror beam splitter 23 which directs a fraction of the light so generated to mirror 28 forming a reference beam 33 of frequencies $f_1$ and $f_2$. The thin film mirror beam splitter 23 is employed to eliminate index of refraction differences and the resulting displacements between the two different wavelengths in transversing a coated glass plate. Mirror 28 reflects reference beam 33 which now passes through thin film mirror beam splitter 23 to surface 29a of thick plate dielectrically coated beam splitter 29. The thick plate beam splitter 29 is dielectrically coated so that it reflects all light of frequency $f_2$ and very little of frequency $f_1$. Thus, it can be seen that light of frequency $f_2$ of reference beam 33 is predominately reflected to photodiode 31 through filter 31a which eliminates any remaining light of frequency $f_1$. The light of reference beam 33 which is predominately of frequency $f_1$ passes through thick plate dielectrically coated beam splitter 29 but undergoes refraction which displaces the beam. Any remaining light of frequency $f_2$ of reference beam 33 is displaced by a greater amount, however, and thus all that passes through slit 30a is of frequency $f_1$ which strikes photodiode 30.

The majority of light of the superimposed laser beams forming beam 22 and having frequencies $f_1$ and $f_2$ passes through thin film mirror beam splitter 23 and is referred to herein as the transmitted beam 34 which passes through the plasma in plasma container 25 provided with Brewster angle windows 26 and 27 to eliminate reflections for light polarized in the plane of the windows. Transmitted beam 34 after having passed through the plasma travels onto mirror 24 which reflects it whereupon it retraces its path through the plasma towards thin film mirror beam splitter 23 where it combines with reference beam 33 reflected by mirror 28 and proceeds to thick plate beam splitter 29. The light of frequency $f_2$ of the recombined beams, reference beam 33 and transmitted beam 34, is directed to photodiode 31 through filter 31a and the light of frequency $f_1$ thereof is directed to photodiode 30 through slit 30a by means of the dielectrically coated thick plate beam splitter 29 in the same manner as described in conjunction with reference beam 33. Thus photodiode 31 reads the sum of light beam of frequency $f_2$ and its reflection after the reflection has passed through the plasma and photodiode 30 reads the sum of light beam of frequency $f_1$ and its reflection after the reflection has passed through the plasma. In each case, one beam, transmitted beam 34, passes twice through the plasma and the other beam, reference beam 33, acts as a reference. Any modulation of the photodiodes output is thus due to index of refraction changes in the plasma and is displayed on the screen of dual-beam oscilloscope 32 coupled to the outputs of photodiodes 30 and 31.

From the basic electric field intensity equation for the sum of two electric fields $E_1$ and $E_2$ with frequencies $f_1$ and $f_2$, respectively:

$$i(t) \alpha I = E^2 = \frac{1}{2} E_1^2 + \frac{1}{2} E_2^2 + E_1 E_2 \cos 2\pi (f_1 - f_2) t$$

we see that the detector, photodiode, current, $i$, is modulated at the difference frequency of the two superimposed beams.

Thus:

$$i(t) \alpha E_1 E_2 \cos 2\pi (f_1 - f_2) t$$

$$i(t) \alpha E_1 E_2 \cos 2\pi (F_d) t$$

since $f_2$ is $f_1 + F_d$, where $F_d$ is the effective Doppler frequency and equals $2v/\lambda$.

In the usual situation, $v$ is the velocity of a moving reflector which in turn is the rate of change in the light path traveled to the mirror and back. This latter definition then is the case here since the light path does change with time by $$N \frac{dn}{dt} l$$

where $l$ is the length of plasma traversed, $N$ is the number of passes through the plasma and $dn/dt$ is the rate of change of plasma refractive index with time. Thus, the detector, photodiode, current is:

$$i(t) \alpha E_1 E_2 \cos 2\pi \left( \frac{N}{\lambda} \cdot \frac{dn}{dt} l \right) t$$

The current thus reaches a minimum when:

$$\frac{2\pi N l \Delta n}{\lambda} = \left( \frac{\pi}{2} \right)(2m - 1)$$

thus:

$$\Delta n = \frac{(2m - 1)\lambda}{4Nl}$$

where $m$ is an integer and denotes the number of minima observed.

Two factors can be noticed. First, greater changes are produced when $\lambda$ is greater (and conversely) and second, we can read the oscilloscope on which the detector, photodiode, current is displayed in fractions of $m$—thus, increasing the sensitivity.

Although specific embodiments of the invention have been illustrated and described, it will be understood that this is but illustrative and that various modifications may be made therein without departing from the spirit of the invention and the scope of the claims.

What is claimed is:

1. An optical interferometer for high speed plasma diagnostics which enables rapid measurements of phase changes due to electron density variations in the plasma comprising, a laser source producing a laser beam of light consisting of two superimposed beams, one of said superimposed beams having a frequency of $f_1$ and the other of the superimposed beams having a frequency of $f_2$, a thin film mirror beam splitter spaced from the laser source and angularly disposed in the path of the beam of laser light whereby a fraction of said beam of laser light comprising a reference beam is reflected at a right angle thereto a first mirror which reflects the reference beam through said thin film mirror beam splitter onto a thick plate dielectrically coated beam splitter in the same angular position as thin film mirror beam splitter and spaced therefrom, a second mirror perpendicularly disposed in the path of the laser beam of light transmitted through said thin film mirror beam splitter, a container containing plasma disposed in said path of the laser beam interposed between the second mirror and thin film mirror beam splitter whereby said laser beam passes through the plasma and is reflected by said second mirror to pass through said plasma twice onto said thin film mirror beam splitter whereby said reference beam and said laser beam are recombined and directed to the thick plate dielectrically coated beam splitter, said thick plate dielectrically coated beam splitter reflecting all the light of frequency $f_2$ of the recombined beams to a first summing means through a filter for eliminating any light of frequency $f_1$ for summing the electric fields of said recombined reference beam and laser beam of $f_2$ frequency, and passing the light of $f_1$ frequency of said recombined beams to a second summing means through slit means for summing the electric field of said recombined reference beam and laser beam of $f_1$ frequency, and means coupled to said first and second summing means for displaying any modulation of the current outputs thereof due to index of refraction changes in the plasma.

2. The invention as defined in claim 1 wherein said first and second summing means comprises photodiodes.

3. The invention as defined in claim 2 wherein said means coupled to said first and second summing means for displaying any modulation of the current outputs thereof due to index of refraction changes in the plasma comprises a dual-beam oscilloscope coupled to the outputs of said first and second summing means.

References Cited

UNITED STATES PATENTS

| | | | |
|---|---|---|---|
| 2,655,074 | 10/1953 | Eckert et al. | 356—113 |
| 2,809,551 | 10/1957 | Svensson | 356—107 |
| 3,409,369 | 11/1968 | Bickel | 356—107 |

RONALD L. WIBERT, Primary Examiner

C. CLARK, Assistant Examiner